C. P. MELVIN.
MOLDING MACHINE.
APPLICATION FILED APR. 11, 1914.
1,285,302.
Patented Nov. 19, 1918.
4 SHEETS—SHEET 1.
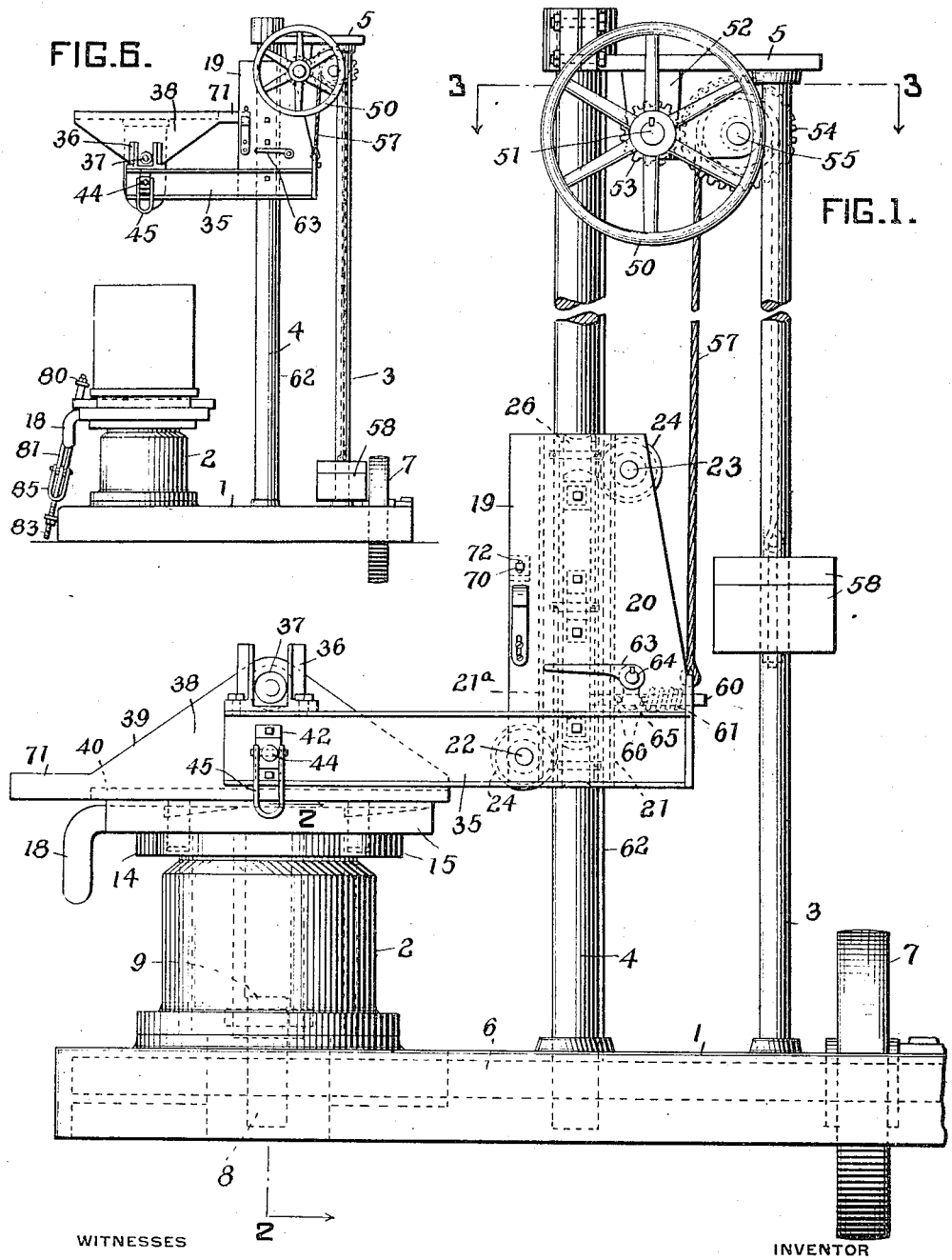
WITNESSES
INVENTOR
Charles P. Melvin
By Fredk. W. Winter
his attorney

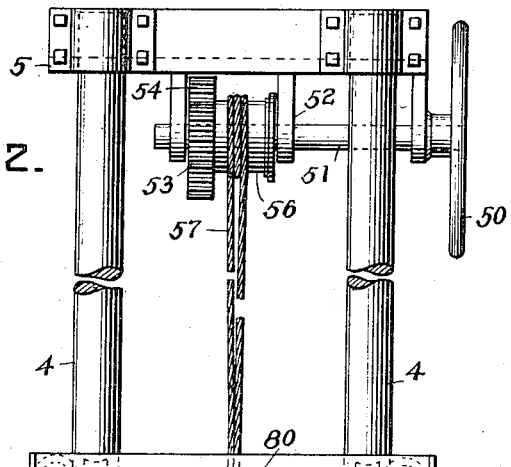
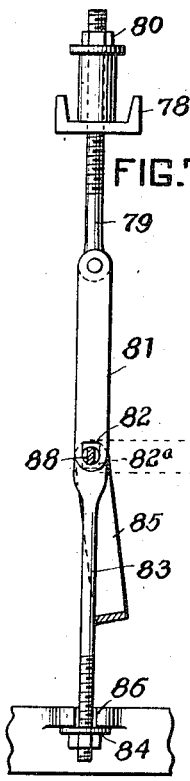
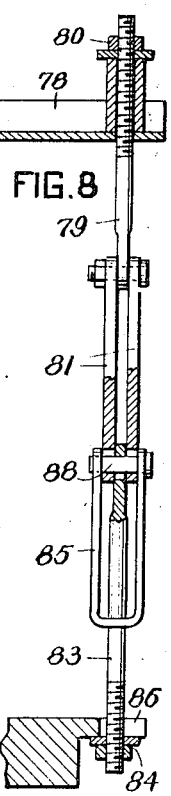
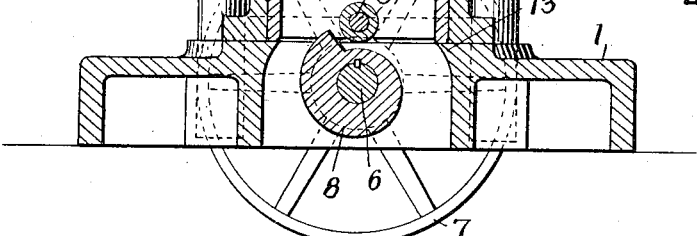

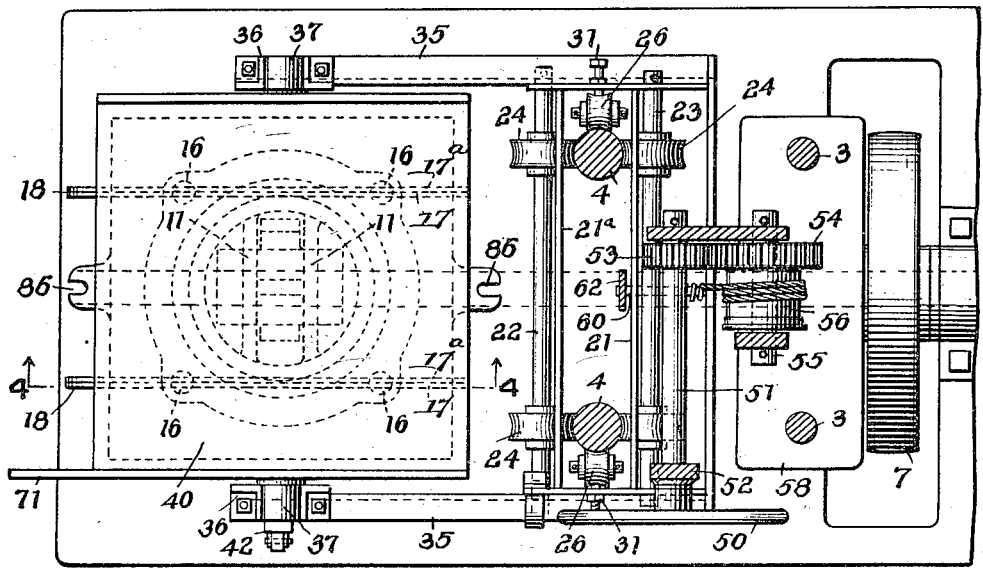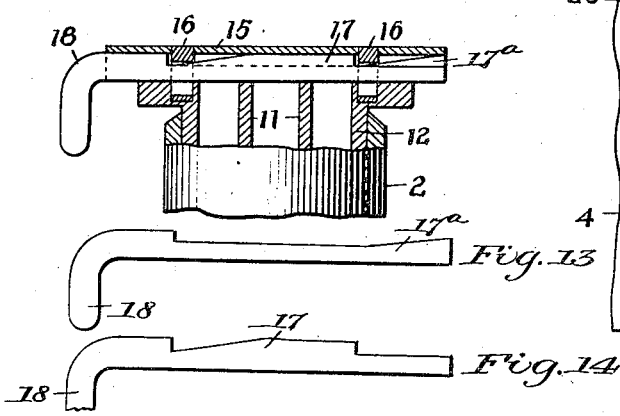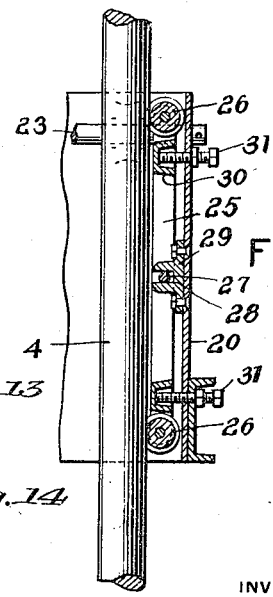

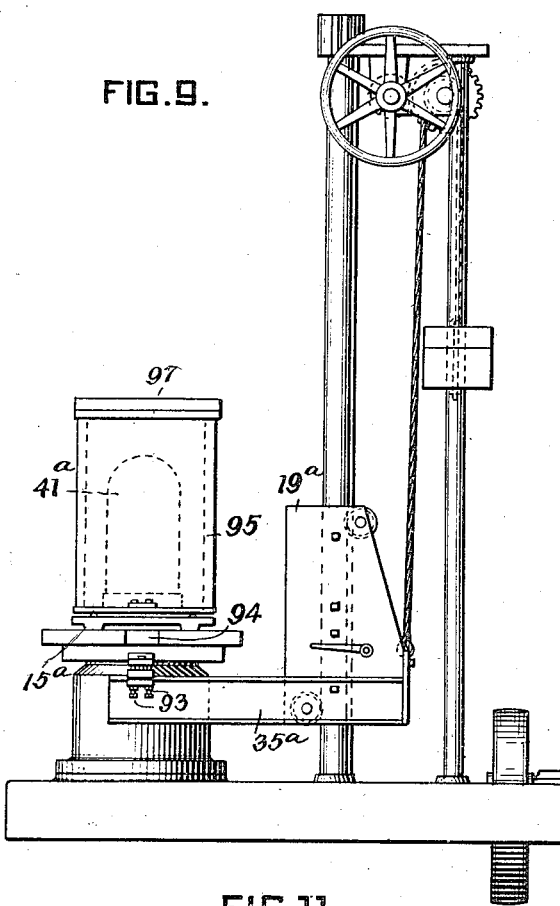
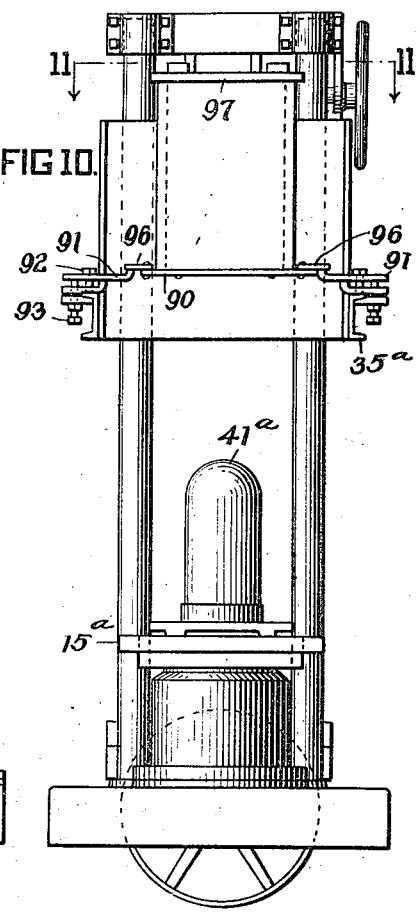
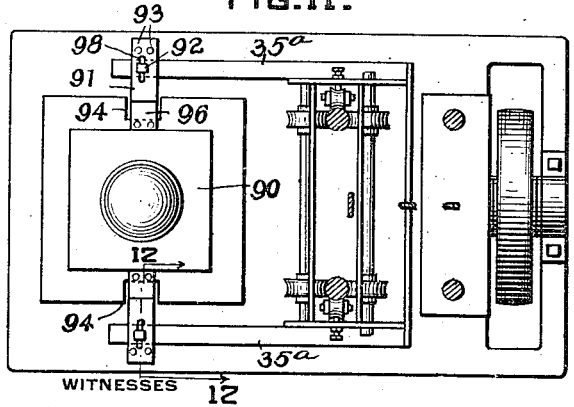
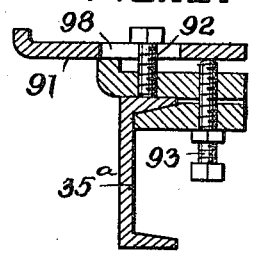

UNITED STATES PATENT OFFICE.

CHARLES P. MELVIN, OF YOUNGSTOWN, OHIO, ASSIGNOR TO THE MELVIN-LLOYD COMPANY, OF YOUNGSTOWN, OHIO, A CORPORATION OF OHIO.

MOLDING-MACHINE.

1,285,302.

Specification of Letters Patent.   Patented Nov. 19, 1918.

Application filed April 11, 1914.   Serial No. 831,320.

*To all whom it may concern:*

Be it known that I, CHARLES P. MELVIN, a resident of Youngstown, in the county of Mahoning and State of Ohio, have invented a new and useful Improvement in Molding-Machines, of which the following is a specification.

This invention relates to molding machines. The object of the invention is to provide a molding machine which is very accurate in operation, which is simple in construction, which enables large or heavy molds to be readily produced, which can be readily manipulated by one or two operators, and which also produces an accurate impression of the pattern.

The invention comprises the construction and arrangement of parts hereinafter described and claimed.

In the drawings, which represent one embodiment of the invention, Figure 1 is a side elevation; Fig. 2 is a front view, partly in section on the line 2—2, Fig. 1; Fig. 3 is a plan view, partly in section on the line 3—3, Fig. 1; Fig. 4 is a detail sectional view on the line 4—4, Fig. 3, illustrating the mold leveling or equalizing devices; Fig. 5 is a detail sectional view of a traveling runner; Fig. 6 is a side elevation corresponding to Fig. 1, and on a smaller scale, and illustrating the mold carrying platen in inverted position; Figs. 7 and 8 are detail views of a clamping device; Fig. 9 is a side elevation of a modified form of the invention; Fig. 10 is a front elevation thereof with the mold elevated; Fig. 11 is a plan view of the same, partly in section on the line 11—11, Fig. 10; Fig. 12 is a detail sectional view on the line 12—12, Fig. 11, and Figs. 13 and 14 are detail views of the wedges for operating certain equalizing supports.

The molding machine shown in the drawings comprises a suitable frame consisting of a base or body 1 which at or near one end is provided with a hollow cylindrical upright portion 2 and at or near the other end with two upright columns 3, and intermediate its ends with two other larger upright columns 4, the several columns 3 and 4 being rigidly connected together at their upper ends by a suitable cap plate or head 5. Said columns are made of sufficient size so as to be perfectly rigid and are maintained in parallelism with each other by the base 1 and cap plate 5.

In the base 1 is journaled a driving shaft 6 provided at one end with driving means, such as the pulley 7, and at or near the other end with an ordinary spiral cam 8, which lies directly under the center of the hollow upright portion 2 of the frame, and which coöperates with a roller 9 journaled on a pin or shaft 10 extending across between two vertical webs 11 in a hollow tubular member 12 which slides vertically within the upright frame portion 2 and whose lower edge is arranged to contact an annular shoulder 13 of the main frame when the roller 9 drops off the high part of the cam 8 to thereby jar the mold carried by said tubular member. The tubular member 12 at its upper end is provided with a flange or table portion 14 to which is secured a table 15, which may comprise one or more straight bars, such as I-beams, channels or the like, but is shown as a solid, rectangular plate, which may be formed of wood, metal, or any other suitable material. In the table 15 are a series of registering openings, four being shown, in each of which is located a vertically movable pin or abutment 16, each of which may be actuated independently of the others by any suitable means, such as a series of wedges 17, 17$^a$ extending through slots in said pins and slidable in horizontal grooves or channels in the table 15 and provided with actuating means at the front of the machine, such as the handles 18.

The columns 4 form guides for a vertically movable mold carrying carriage 19, consisting of rigidly connected side walls 20, a rear wall 21, and a front wall 21$^a$. The side walls 20 are connected by two cross shafts 22 and 23, the first of which is on the mold side of the standards 4 and at or near the lower end of the carriage 19, and the second of which is on the other side of said standards and near the upper end of the carriage. Said shafts carry loosely rotatable grooved rollers 24, preferably provided with ball or roller bearings, which travel along the columns 4 and which transmit the weight of the movable platen and mold to said columns. Each side wall 20 of the carriage 19 is provided with an adjustable vertical runner member 25, having rollers 26 at its opposite ends which travel along the outer faces of the columns 4. Intermediate its ends the runner member 25 is provided with a cross pin 27 which fits in a horizontal slot or opening

28 in a bracket 29 riveted, bolted or otherwise secured to the side wall 20, and which prevents vertical movement of the runner member with reference to the carriage 19. Said runner member is also provided with two abutments 30, one on each side of the pin 27, and shown as cup-shaped members into which project adjusting screws 31 threaded through the side walls 20 of the carriage. By properly adjusting the screws on the two sides of the machine, the carriage 19 may be tilted slightly sidewise, in order to level the platen when in inverted position, so as to enable the pattern to be drawn out of the mold without breaking the latter, or to incline the platen when inverted in cases where the pattern has greater draft on one side than on the other. The screws 31 also enable all lost motion or play to be taken up between the columns 4 and carriage 19.

Carriage 19 is provided with two horizontal side arms 35, shown as channel members riveted or otherwise secured to the outer surfaces of the side walls 20, and which project out over the table 15. The arms 35 are provided at their outer ends with U-shaped brackets 36, between the arms of which are located trunnions 37 attached to the upper ends of the V-shaped side walls 38 of reversible platen 39, which may be a sheet metal member, but is shown as built up of two side members and a wooden floor 40 to which the pattern 41 is rigidly screwed or bolted. One of the side arms 35 is provided with a hollow casing 42 in which is located spiral spring 43 which acts inwardly against the ends of a cross pin or shoulder on a locking pin 44, which is adapted to be forced inwardly into a suitable opening in the side wall of the platen 39, in order to lock said platen against rotation. The locking pin 44 is preferably provided with suitable means for withdrawing the same, such as the pivoted handle 45, which may be turned to the position shown in Fig. 2 to withdraw the pin, and which when placed in line with said pin permits it to enter the locking opening.

The mold supporting carriage 19, and the mold carried thereby are moved vertically along the columns or standards 4 by any suitable devices which may be power driven but are shown as hand operated. Said devices consist of a hand wheel 50 for rotating a shaft 51 journaled in brackets 52 attached to or forming part of the head or cap 5, and which shaft is provided with a small pinion 53 meshing with a larger pinion 54 on a shaft 55 carrying a winding drum 56 around which are looped several turns of a cable 57, which at one end is attached to the carriage 19, as to the rear wall 21 thereof, and which at the other end is provided with a suitable counterweight 58, preferably consisting of several members so that its weight can be adjusted. This counterweight is preferably adjusted to a weight intermediate that of the frame 19, platen 39 and pattern 41 and the weight of these parts plus the mold flask and sand, as more fully hereinafter described.

The carriage 19 is provided with suitable means for locking it in its lowest position, where the bottoms of the brackets 36 are slightly below the trunnions 37 on the platen 39 when the tubular member 12 is resting on the annular ledge 13, as shown in Fig. 1, to avoid the communication of shock and jar to the arms 35 and the frame 19. This locking means comprises a pin 60 which is forced by a spiral spring 61 into an opening in a vertical strip or bar 62 attached at its upper and lower ends to the frame. The locking pin may be withdrawn from said opening to release the carriage 19 by an operating handle 63, attached to one end of a shaft 64 and which is provided with an arm 65 working between two abutments 66 on the locking pin. Carriage 19 is also provided with suitable means for locking the platen 39 in inverted or reversed position, that is, in the position shown in Fig. 6. These devices comprise an abutment 70 arranged to be contacted by a projecting portion 71 of the reversible platen, and which abutment preferably consists of an angle member secured to the frame 19 by a bolt or bolts 72 passing through an elongated slot therein, so that the abutment can be adjusted vertically for accuracy. The platen is held in inverted position by a locking device consisting of a bevel strike 73 projecting inwardly through an opening in the side wall of the frame 19, and which is attached to a leaf spring 74 having a thumb-piece 75 at one end for withdrawing the latch, and which spring is attached to the frame by screws or bolts passing through an elongated slot therein, so that said strike may be adjusted vertically on the frame.

The machine described is used as follows:—

Assuming the parts to be in the position shown in Figs. 1, 2 and 3, with the pattern fastened to the platen, a molding flask open at top and bottom is placed in position upon the platen and a hopper is placed upon the flask. Molding sand is then shoveled into the hopper to fill the flask. The power is then turned on to rotate pulley 7, shaft 6 and the cam 8. Each time the cam turns over it lifts the roller 9, tables 14 and 15, the platen 39 and the mold, and causes the sand to settle and pack tightly into the flask around the pattern. The jarring or jolting operation is continued for a suitable length of time and the sand is then tamped down by hand around the edges of the flask. The hopper is then removed and usually is scraped across the top of the flask to level the upper surface of the sand, although a separate slicing bar may be used for this purpose, if desired. A cover 77 is then applied to the top of the molding flask and the entire mold and cover are clamped to the platen by any suitable means. The means shown, and which is illustrated in detail in Fig. 7, comprises a bar 78 which is placed across the top of the cover 77, and which is provided at each end with rigid rods 79, preferably provided with an adjusting nut 80. Rods 79 are provided with a pivoted link 81, having an elongated opening 82 therein, which coöperates with another rod 83 having a similar elongated opening 82$^a$, and which at its lower end has a head 84 adapted to be slipped into a notch or opening in the platen 39, and shown as notches in the ends of a member or members 86 secured to said platen. The clamping devices are operated by bent metal levers 85 each provided with a cross pin 88, which is oblong in cross section and which passes through the openings 82, 82$^a$, in the links 81 and 83. By turning said lever to the position shown in dotted lines Fig. 7, the pin 88 is placed with its longer diameter crosswise of the links 81 and 83 and releases the clamp, while when turned to the position shown in full lines the pin is placed with its longer diameter longitudinally of the links and draws the bar 78 down upon the flask cover, and thereby clamps the entire mold to the platen.

When the mold is fully clamped the locking pin is released and the hand wheel 50 is turned to elevate the carriage 19, platen 39 and the mold to the proper level, when the locking pin 44 is withdrawn and the mold and platen are allowed to swing downwardly, that is to the left in Fig. 1, until the mold is underneath the arms 35, in which position the mold is suspended on the trunnion 37. In turning, the projection 71 of the platen passes beyond the latch 73, which swings out beneath the same and holds it, and abuts against the stop 70. Hand wheel 50 is now operated to lower the mold upon the table 15, or to a position very slightly above the same. The wedges 17, 17$^a$ are then drawn out independently of each other by means of their handles 18 so as to lift the equalizing or leveling pins 16 into contact with the bottom of the flask. This firmly supports the flask with its axis truly vertical, and compensates for any roughness or inequalities in the covers 77. The rods 83 are then forced out of the slots in the members 86 to release the flask from the platen and the hand wheel 50 is operated to lift the platen and pattern, which are simultaneously tapped or vibrated mechanically or by hand so as to separate the pattern from the sand. When the pattern begins to separate from the sand, the counterweight 58 is usually sufficient to lift the carriage 19, platen 39 and pattern to the position shown in Fig. 6 without manual assistance, except to apply pressure to the hand wheel 50 to prevent the carriage from rising too rapidly. The cover 77 with the mold thereon is then lifted off from the table 15 and is set aside for the casting operation. Latch 73 is then withdrawn to release the platen, which swings back to its original position, and the platen is then lowered upon the table for another molding operation.

Figs. 9 to 12 show a modified form of the invention in which the platen 39 is dispensed with. In this arrangement the pattern 41$^a$ is secured directly to the table 15$^a$, and a stripping plate 90 having an opening of the same shape as the pattern is placed on said table around the pattern. The arms 35$^a$ are each provided with a lifting member 91, which is held to said arm by a bolt 92, and which may be adjusted by means of two tap screws 93 threaded through said arms and which engage the under surfaces of the corners of the lifting members. These lifting members project inwardly toward the pattern from the side arms. The table 15$^a$, in this case, is provided in its opposite edges with openings 94 to permit the lifting members 91 to pass.

With the arrangement just described, a flask 95 is placed upon the stripping plate 90 around the pattern and the sand is poured in from above as before and is packed down by operating the jarring cam. When the jarring operation is finished a cover is applied to the top of the flask and the carriage 19$^a$ is elevated to cause the lifting arms 91 to engage projections 96 on the stripping plate 90 and thereby lift the mold off from the pattern. When the mold and pattern are entirely free of each other the mold and stripping plate are lifted off from the arms 91, a cover 97 is applied to the mold and it is inverted in the usual manner. The lifting arms 91 may be slotted longitudinally, as at 98, or in any other manner may be adjustable in order to engage different sizes or styles of the stripper plate. The other parts of the mechanism, such as the cam for jarring the mold and the mechanism for elevating and lowering the carriage, are of substantially the same form and arrangement as in the machine first described.

What I claim is:

1. A molding machine, comprising a table, means for jarring said table, a plurality of vertically movable equalizing supports on said table, and means for adjusting each of said supports vertically in said table independently of the other supports.

2. A molding machine, comprising a table, means for vibrating said table, a platen supported by said table, a vertically movable carriage having arms arranged to engage said platen for lifting the same, said carriage being movable to a position in which said arms are below the lowest position of said platen, and means for locking said carriage in said position.

3. A molding machine, comprising a table for supporting a mold, vertical columns, a carriage movable along on said columns and provided with runner members traveling thereon, and means for adjusting said runner members to level the carriage to avoid vibration of said carriage.

4. A molding machine, comprising a table for supporting a mold, vertical columns, a carriage movable along said columns and provided with means for lifting said mold, and runner members carried by said carriage and adjustable toward and from said columns and provided with antifriction members traveling thereon.

5. A molding machine comprising a table for supporting a mold, vertical columns, a carriage movable on said columns and provided with means for lifting the mold, pivoted runner members on said carriage and arranged to travel along said columns, and means for adjusting said runner members toward and from the columns for leveling said carriage and mold.

In testimony whereof, I have hereunto set my hand.

CHARLES P. MELVIN.

Witnesses:
F. W. WINTER,
G. H. LERESCHE.

Copies of this patent may be obtained for five cents each, by addressing the "Commissioner of Patents, Washington, D. C."